US012641072B2

(12) United States Patent
     Patel et al.

(10) Patent No.: US 12,641,072 B2
(45) Date of Patent: May 26, 2026

(54) LAUNCHING AUTHENTICATED CONTENT ON ARM REALM MANAGEMENT MODE ARCHITECTURE SYSTEMS

(71) Applicant: DELL PRODUCTS L.P., Round Rock, TX (US)

(72) Inventors: Bhavesh A. Patel, Austin, TX (US); Sumanth Vidyadhara, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 134 days.

(21) Appl. No.: 18/649,580

(22) Filed: Apr. 29, 2024

(65) Prior Publication Data

US 2025/0337726 A1     Oct. 30, 2025

(51) Int. Cl.
    *H04L 9/40*      (2022.01)
    *G06F 9/455*     (2018.01)

(52) U.S. Cl.
    CPC ...... *H04L 63/0823* (2013.01); *G06F 9/45558* (2013.01); *G06F 2009/4557* (2013.01); *G06F 2009/45587* (2013.01)

(58) Field of Classification Search
    None
    See application file for complete search history.

(56) References Cited

U.S. PATENT DOCUMENTS

| | | | | |
|---|---|---|---|---|
| 11,449,437 | B2 | 9/2022 | Parker et al. | |
| 11,606,104 | B1 * | 3/2023 | Segal | G06F 11/1415 |
| 2009/0232011 | A1 * | 9/2009 | Li | H04L 43/50 |
| | | | | 370/248 |
| 2010/0037243 | A1 * | 2/2010 | Mo | G06F 9/45533 |
| | | | | 719/328 |
| 2014/0090077 | A1 * | 3/2014 | Jeong | G06F 21/51 |
| | | | | 726/26 |
| 2014/0181506 | A1 * | 6/2014 | Resch | H04L 63/0823 |
| | | | | 713/156 |
| 2015/0089221 | A1 * | 3/2015 | Taylor | H04L 9/3236 |
| | | | | 713/168 |
| 2020/0174950 | A1 | 6/2020 | Parker et al. | |
| 2021/0334222 | A1 * | 10/2021 | Wood | G06F 21/79 |

* cited by examiner

*Primary Examiner* — Raqiul A Choudhury
(74) *Attorney, Agent, or Firm* — Larson Newman, LLP

(57) ABSTRACT

An information handling system includes a BMC and a processor. The processor provides a guest operating stack and a Realm operating stack. The processor further launches a Realm on the Realm operating stack and loads an application on the Realm. The processor instantiates a Realm management monitor (RMM) on the Realm operating stack. The RMM provides a Realm initial measurement (RIM) for the Realm, generates a Realm attestation token based on the RIM, and provides the Realm attestation token to the BMC. The RIM includes information to identify the application. The BMC determines whether the application is authenticated by a certificate authority based on the Realm attestation token and directs the processor to schedule execution of the Realm when the application is authenticated by the certificate authority.

16 Claims, 3 Drawing Sheets

LAUNCHING AUTHENTICATED CONTENT ON ARM REALM MANAGEMENT MODE ARCHITECTURE SYSTEMS

FIELD OF THE DISCLOSURE

This disclosure generally relates to information handling systems, and more particularly relates to launching authenticated content on Arm Realm management mode architecture systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a BMC and a processor. The processor may provide a guest operating stack and a Realm operating stack. The processor may further launch a Realm on the Realm operating stack and load an application on the Realm. The processor may instantiate a Realm management monitor (RMM) on the Realm operating stack. The RMM may provide a Realm initial measurement (RIM) for the Realm, generate a Realm attestation token based on the RIM, and provide the Realm attestation token to the BMC. The RIM may include information to identify the application. The BMC may determine whether the application is authenticated by a certificate authority based on the Realm attestation token and direct the processor to schedule execution of the Realm when the application is authenticated by the certificate authority.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
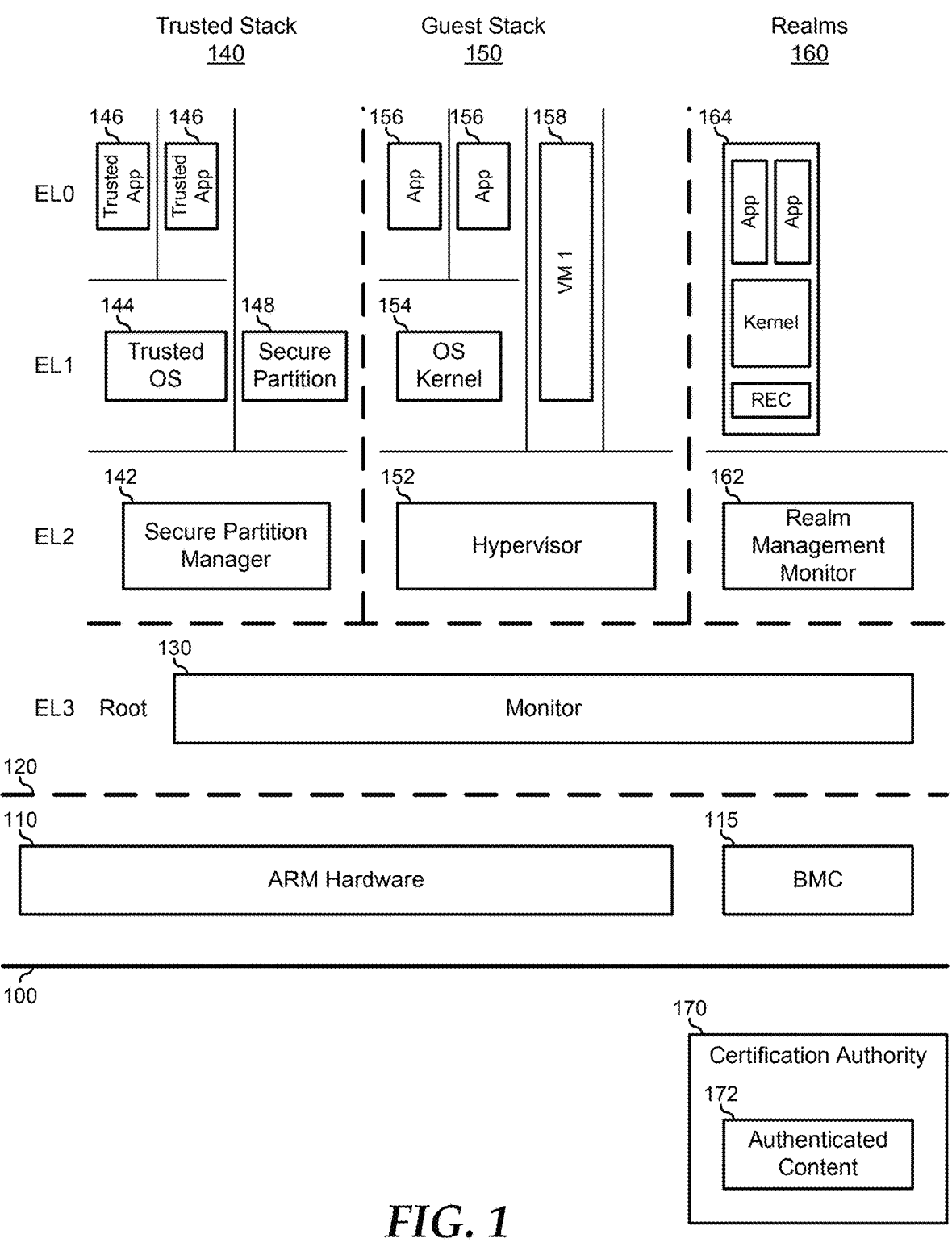
FIG. 1 is a block diagram illustrating an information handling system according to an embodiment of the present disclosure.

FIG. 1 illustrates an information handling system 100 including ARM processor 110 and a baseboard management controller 115 in a hardware level of the information handling system. ARM hardware 110 represents a processing architecture based upon an ARM v9-A architecture or one or more ARM architecture specifications as may be published from time to time by the ARM company. In particular ARM processor 110 represents one or more processor and accompanying processing devices, such as memory devices, storage devices, input/output (I/O) devices, or the like. The processor may represent an integrated device that includes the functionality of a central processing unit (CPU) and a graphical processing unit (GPU) on a single System-on-a-Chip (SoC), as needed or desired. In a particular embodiment, ARM processor 110 implements a Trust Zone functionality and a Real Management Extension (RME) functionality, as described further below.

ARM processor 110 instantiates a four (4) tiered operating environment, including Exception Levels 0-3 (EL0, EL1, EL2, and EL3). EL3 is the highest privilege level, sometimes referred to as a "Root" level, and includes a monitor 130. Thus monitor 130 represents code that is deemed the most trusted code on information handling system 100. Thus monitor 130 is responsible for managing access to available security states and acts as a gatekeeper, controlling access to the security states of EL2, EL1, and EL0. In particular, monitor 130 handles context switching of the processing engines between the security states, and manages the assignment of memory to different Physical Address Spaces (PAS). This is performed by writing to the Granule Protection Table (GPT), which is only accessible from the Root security state. Within Exception Levels EL0-EL2, ARM processor 110 instantiates three (3) separate software stacks: a trusted stack 140, a guest stack 150, and Realms 160.

Trusted stack 140 provides a trusted execution environment (TEE), and includes a secure partition manager 142 in EL2, a trusted operating system (OS) 144 and a secure partition 148 in EL1, and trusted applications 146 in EL0. Trusted stack 140 represents a secure environment instantiated on information handling system 100. In particular, the software utilized to instantiate secure partition manager 142 may be deemed to be secure based on the overall security of information handling system 100, and may derive authentication from the same authentication authority as monitor 130. In this regard, trusted stack 140 provides a highly secure processing environment within information handling system 100, and data and I/O operations may be conducted solely within secure partition 148. Thus, trusted applications 146 may be deemed to be trusted. Trusted stack 140 is set up during a system boot phase of operation of information handling system 100, and therefore is inflexible as to the applications that can be run in trusted stack 140, trusted applications 146 being designated in the setup of the trusted stack at the system boot phase. The details of setting up and running a trusted stack on an information handling system are known in the art and will not be further described herein, except as may be needed to illustrate the current embodiments.

Guest stack 150 includes a hypervisor 152 in EL2 that instantiates an OS kernel 154 in EL1 that can be utilized to launch one or more apps 156 in EL0. Hypervisor 152 also operates to instantiate one or more virtual machine (VM) 158. Guest stack 150 is not as secure as trusted stack 140 because applications 156 and VM 158 may be provided by untrusted sources, and the operating data may come from outside of guest stack 150. The details of setting up and running a guest stack on an information handling system are known in the art and will not be further described herein, except as may be needed to illustrate the current embodiments.

Realms 160 operates to provide an unsecure environment, that is guest stack 150, with a TEE that preserves the confidentiality and integrity of the processes performed within the Realms, bypassing the static behavior of trusted stack 140. Realms 160 include a Realm management monitor 162 in EL2. A Realm 164 is instantiated in EL1 and EL2. Realm management monitor 162 manages the execution environments instantiated in the Realms (such as Realm 164), and utilizes existing hypervisor technologies such as stage 2 translation tables and register save/restore sequences to manage the Realms. However in several aspects, Realm management monitor 162 may be simpler than a typical hypervisor because the Realm management monitor does not provide dynamic resource allocation, make scheduling decisions, manage interrupts, or provide complex device emulation.

Realm 164 includes one or more Realm execution context (REC) that corresponds with a virtual CPU and that allows applications to securely process confidential data. Realm 164 further includes a kernel, and one or more applications. In a particular embodiment, Realm 164 is created and populated with the REC, the kernel, and the applications by VM 158. The information provided by VM 158 includes both memory contents and the register state of the REC. This initial content is measured by RMM 162 and is stored in a Realm metadata structure. Once Realm 164 has been fully constructed, VM 158 executes a Realm management interface (RMI) command to activate the Realm. This step constitutes a temporal boundary, in that once activated, the contents of Realm 164 are no longer modifiable by VM 158, and the Realm measurement is immutable.

To activate Realm 164, VM 158 issues an RMI command, and the integrity of the Realm is protected. However the contents of Realm 164 do not necessarily include any confidential information because they were provided by VM 168, which is in the untrusted guest stack 150. Thus, before provisioning Realm 164 with any secrets, the Realm owner (i.e., VM 158) first needs to establish trust in the Realm. To do this, the Realm owner needs to establish that Realm 164 has been correctly constructed and is hosted on a robust implementation of the Arm CCA hardware architecture. This trust is established through an attestation process.

Figure 2:
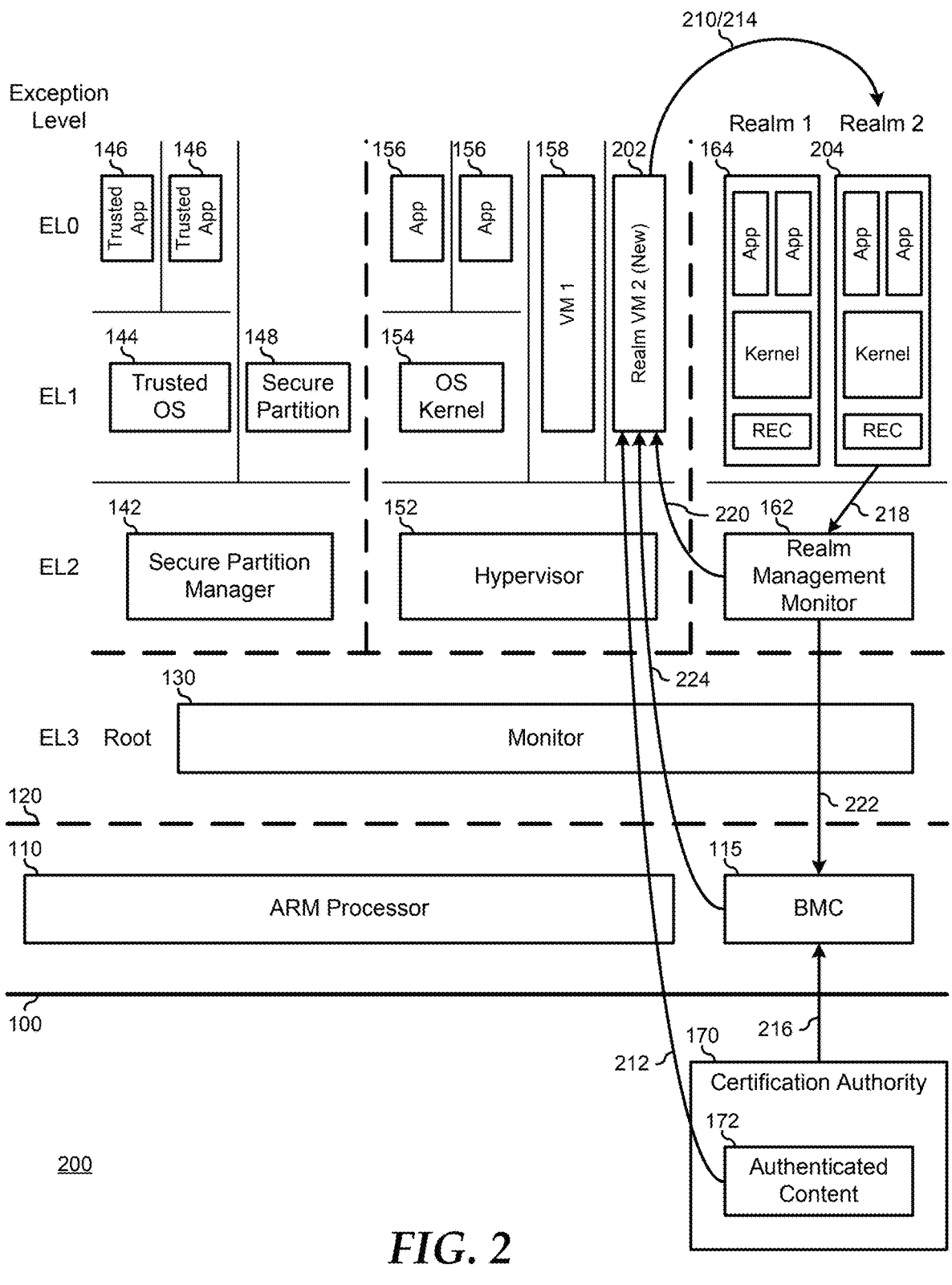
FIG. 2 illustrates an attestation process on the information handling system of FIG. 1.

FIG. 2 illustrates an attestation process 200 on information handling system 100. A VM 202 is created by hypervisor 152 in guest stack 150. VM 202 is created to direct the instantiation of a Realm 204 on Realms 160. As such, VM 202 is shown as a Realm VM (Realm VM 2). In a process step 210, VM 202 instantiates Realm 204, establishes one or more REC in the realm, and populates the Realm with a kernel and one or more application. However in populating realm 204 with the application, VM 202 operates in a process step 212 to receive the application from a verified and attested source. As such, information handling system 100 is illustrated as being associated with a certificate authority 170 which includes authenticated content 172. Authenticated content 172 may be separate from certificate authority 170, as needed or desired. For example, certificate authority 170 and authenticated content 172 may each be provided by a different third-party vendor accessible to information handling system 100.

The content provided by authenticated content 172 may include the application to be installed into realm 204, and such application is authenticated and attested to by content authority 170. In any case, VM 202 receives the application for Realm 204 from authenticated content 172 in process step 212, and provisions the application to the Realm in process step 214. When VM 202 retrieves the program from authenticated content 172 in process step 212, content authority 170 operates, in a process step 216, to provide information to BMC 115 that the program is authenticated by the certificate authority. BMC 115 operates to provide the authentication information within an approved content list managed by the BMC.

Then in a process step 218, Realm 204 requests a Realm Initial Measurement (RIM) report from RMM 162, and the RIM report is sent to VM 202 in a process step 220. The RIM report contains the measurement of the initial state of Realm 204, including measurements of the application (that is, the application that is attested to by certificate authority 170), measurements of firmware components including Monitor 130 and RMM 162, and the identity of the hardware platform (that is, that ARM processor 110 represents hardware that is in conformance with the ARM CCA architecture). The report provides sufficient evidence to allow VM 202 to decide whether to trust Realm 204. In particular, RMM 162 generates a Realm attestation token that cryptographically hashes the RIM, and the RMM further generates a Realm authentication key that cryptographically binds the Realm attestation token to the underlying physical platform (that is, ARM processor 110).

In a next process step 222, RMM 162 communicates with BMC 115 to identify the Realm attestation token for Realm 204. BMC 115 operates to validate the Realm attestation token to determine whether the application that was installed into Realm 204 is included in the approved content list managed. When the application installed into Realm 204 is included in the approved content list, BMC 115 creates a platform token based on the hardware configuration and the Realm attestation key. BMC 115 then generates a validated Realm attestation report, and, in a final process step 224, provides the Realm attestation report to VM 202. VM 202 is then provided with the assurance that the contents of realm 204 are validated and can proceed to schedule operation on the Realm, as needed or desired.

If the application installed into Realm 204 is not included in the approved content list, BMC 115 may operate to query certification authority 170 to determine if the application is provided from authenticated content 172 and that the application was somehow not added to or removed from the approved content list, and if so, then to generate the validated Realm attestation report, and to provide the Realm attestation report to VM 202. On the other hand, if the application was not provided from authenticated content 172, then BMC 115 operates to provide information to VM 202 that the application in Realm 204 is not secured. VM 202 may operate to schedule Realm 204 for execution but to treat any data received from the Realm as suspect data, or to isolate the Realm and not schedule the Realm for execution.

In a particular embodiment, information handling system 100 represents a platform that is manufactured by a particular manufacturer. The applications provided to the VMs and Realms instantiated on information handling system 100 may be optimized based upon the particular design of the information handling system. In this way, the manufacturer may provide a value-added user experience when the user utilizes such optimized applications, as opposed to other similar, non-optimized applications. The manufacturer may provide such optimized applications through authenticated content 172, thereby providing a mechanism to ensure that the manufacturer-optimized applications are preferentially instantiated on information handling system 100 (that is, by virtue of the attestation process described above). Thus, in addition to the security of operation of applications provided by the current embodiments, information handling system 100 operates to provide a method to assure that the manufacturer-optimized applications provide the ultimate in user performance and experience. In a particular case, the applications provided by authenticated content 172 may include various machine language (ML) models that have been optimized by the manufacturer to make the best use of the architectural resources of information handling system 100, as needed or desired.

Figure 3:
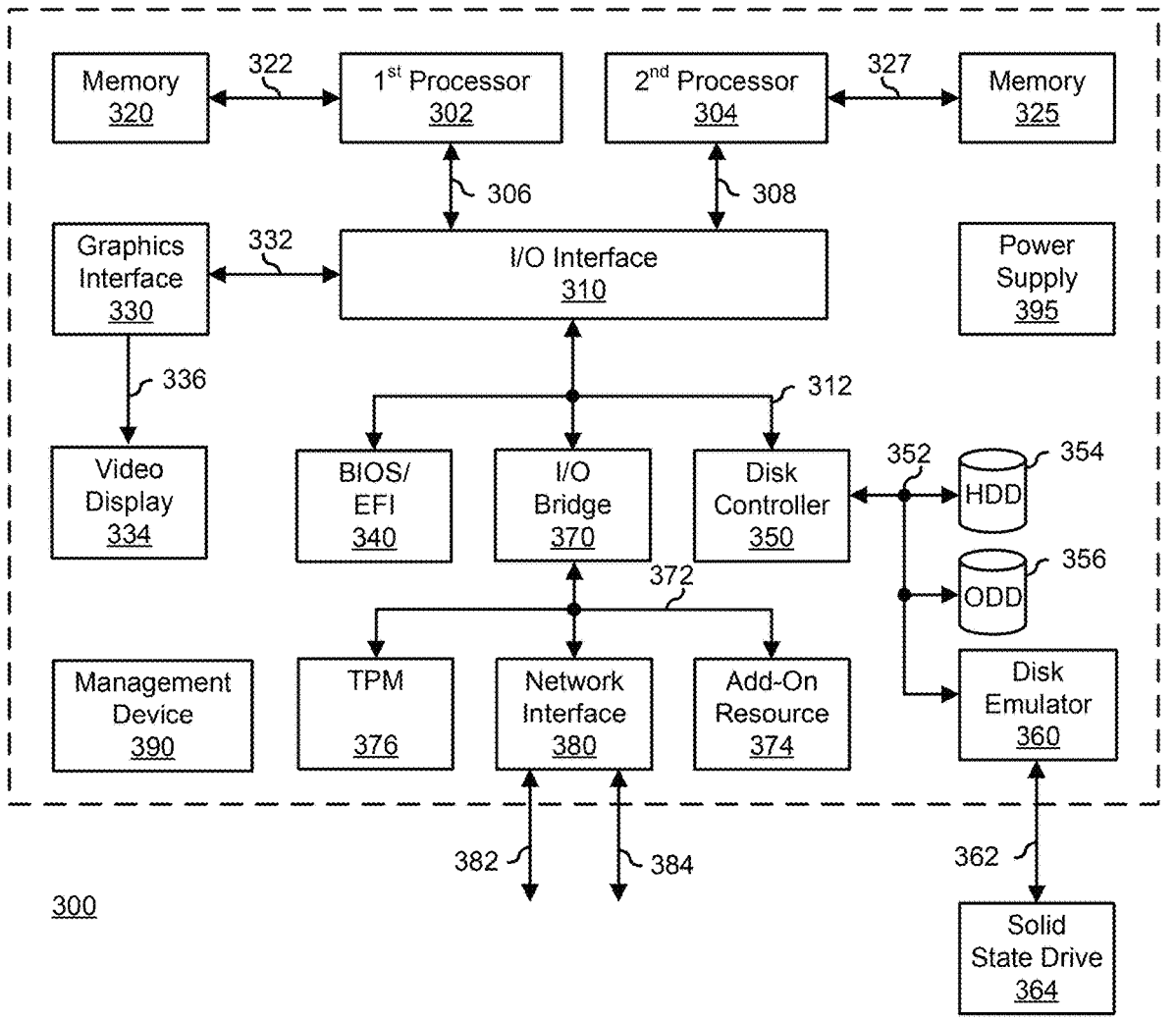
FIG. 3 is a block diagram illustrating a generalized information handling system according to another embodiment of the present disclosure.

FIG. 3 illustrates a generalized embodiment of an information handling system 300 similar to information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 336 to a video display 334. In a particular embodiment, information handling system 300 includes separate memories that are dedicated to each of processors 302 and 304 via separate memory interfaces. An example of memories 320 and 330 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 where peripheral interface 372 and the I/O channel are of the same type, and the I/O bridge translates information from a format suitable to the I/O channel to a format suitable to the peripheral channel 372 where they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 where the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a baseboard management controller (BMC); and
   a processor configured to provide a guest operating stack and a Realm operating stack, wherein the processor operates to launch a Realm on the Realm operating stack, to load an application on the Realm, and to instantiate a Realm management monitor (RMM) on the Realm operating stack, wherein the RMM provides a Realm initial measurement (RIM) for the Realm, generates a Realm attestation token based on the RIM, and provides the Realm attestation token to the BMC, wherein the RIM includes information to identify the application;
   wherein the BMC determines whether the application is authenticated by a certificate authority based on the Realm attestation token, and directs the processor to schedule execution of the Realm when the application is authenticated by the certificate authority by determining whether the application is included in an approved content list, and when the application is included in the approved content list, the BMC further receives information that the application is authenticated by the certificate authority from the certificate authority when the processor loads the application on the Realm.

2. The information handling system of claim 1, wherein the processor further instantiates a virtual machine on the guest operating stack, the virtual machine configured to launch the Realm and to load the application on the Realm.

3. The information handling system of claim 2, wherein the Realm is associated with the virtual machine.

4. The information handling system of claim 3, wherein in directing the processor to schedule the execution of the Realm, the BMC is further configured to direct the virtual machine to schedule the execution of the Realm.

5. The information handling system of claim 1, wherein when the application is not included in the approved content list, the BMC is further configured to direct the processor to halt execution of the Realm.

6. The information handling system of claim 1, wherein when the application is not included in the approved content list, the BMC is further configured to query the certificate authority to determining whether the application is authenticated.

7. The information handling system of claim 6, wherein when the certificate authority indicates that the application is authenticated, the BMC is further configured to direct the processor to schedule execution of the Realm.

8. The information handling system of claim 6, wherein when the certificate authority indicates that the application is not authenticated, the BMC is further configured to direct the processor to halt execution of the Realm.

9. A method, comprising:

providing, by processor of an information handling system, a trusted operating stack, a guest operating stack, and a Realm operating stack;

launching, by the processor, a Realm on the Realm operating stack;

loading, by the processor, an application on the Realm;

instantiating, by the processor, a Realm management monitor (RMM) on the Realm operating stack, wherein the RMM provides a Realm initial measurement (RIM) for the Realm, generates a Realm attestation token based on the RIM, and provides the Realm attestation token to a baseboard management controller (BMC) of the information handling system, wherein the RIM includes information to identify the application;

determining, by the BMC, the application is authenticated by a certificate authority based on the Realm attestation token; and directing, by the BMC, the processor to schedule execution of the Realm when the application is authenticated by the certificate authority wherein in determining whether the application is authenticated by the certificate authority, the method further comprises determining whether the application is included in an approved content list, and wherein when the application is included in the approved content list, the method further comprises receiving information that the application is authenticated by the certificate authority from the certificate authority when the processor loads the application on the Realm.

10. The method of claim 9, further comprising instantiating a virtual machine on the guest operating stack, the virtual machine configured to launch the Realm and to load the application on the Realm.

11. The method of claim 10, wherein the Realm is associated with the virtual machine.

12. The method of claim 11, wherein in directing the processor to schedule the execution of the Realm, the method further comprises directing the virtual machine to schedule the execution of the Realm.

13. The method of claim 9, wherein when the application is not included in the approved content list, the method further comprises directing the processor to halt execution of the Realm.

14. The method of claim 9, wherein when the application is not included in the approved content list, the method further comprises querying the certificate authority to determine whether the application is authenticated.

15. The method of claim 14, wherein:

directing the processor to schedule execution of the Realm when the certificate authority indicates that the application is authenticated; and directing the processor to halt execution of the Realm when the certificate authority indicates that the application is not authenticated.

16. An information handling system, comprising:

a baseboard management controller (BMC); and a processor configured to provide a trusted operating stack, a guest operating stack, and a Realm operating stack, wherein the processor launches a Realm on the Realm operating stack, loads an application on the Realm, and instantiates a Realm management monitor (RMM) on the Realm operating stack, wherein the RMM provides a Realm initial measurement (RIM) for the Realm, generates a Realm attestation token based on the RIM, and provides the Realm attestation token to the BMC, wherein the RIM includes information to identify the application;

wherein the BMC determines whether the application is authenticated by a certificate authority based on the Realm attestation token, and directs the processor to schedule execution of the Realm when the application is authenticated by the certificate authority by determining whether the application is included in an approved content list, and when the application is included in the approved content list, the BMC further receives information that the application is authenticated by the certificate authority from the certificate authority when the processor loads the application on the Realm.

* * * * *